United States Patent [19]

Blair et al.

[11] Patent Number: 5,468,582
[45] Date of Patent: Nov. 21, 1995

[54] FUSED OPTICAL LAYER AND METHOD OF MAKING

[75] Inventors: Thomas H. Blair, Schaumburg, Ill.; Michael S. Lebby, Apache Junction, Ariz.

[73] Assignee: Motorola, Inc., Schaumburg, Ill.

[21] Appl. No.: 996,748

[22] Filed: Dec. 24, 1992

[51] Int. Cl.⁶ ..................... G03G 13/22
[52] U.S. Cl. ............. 430/54; 430/126; 430/945
[58] Field of Search ................ 430/126, 945, 430/54

[56] References Cited

U.S. PATENT DOCUMENTS

| | | | |
|---|---|---|---|
| 4,980,253 | 12/1990 | Kasahara | 430/126 |
| 5,219,698 | 6/1993 | Suzuki | 430/945 |

OTHER PUBLICATIONS

Yuzo Ono et al., Optoelectronic Technology and Lightwave Communications Systems, 1989, 670–673, New York, N.Y.
J. M. Fleischer et al., Laser–Optical System of the IBM 3800 Printer, Sep. 1977, 479–483, IBM Journal of Research and Development.

*Primary Examiner*—John Goodrow
*Attorney, Agent, or Firm*—Gary F. Witting; Eugene A. Parsons

[57] ABSTRACT

A method for making an optical layer including, a first pattern projected onto a radiation sensitive surface having a first charge. Radiant energy is used to locally change the surface charge, thereby producing local areas having a second charge. The surface is exposed to an optical media having a charge that attracts the optical media to the surface. A substrate (123) with an associated charge is passed in proximity to the surface having the optical media attached. The optical media detaches from the surface and is deposited onto the substrate. The substrate (124) is heated, thereby fusing the optical media to make an optical layer (202).

14 Claims, 1 Drawing Sheet

FUSED OPTICAL LAYER AND METHOD OF MAKING

BACKGROUND OF THE INVENTION

This invention relates, in general, to fabrication of optical devices and, more particularly, to optical layers and optical waveguides.

At present, optical layers and optical waveguides are made in a variety of methods such as, photolithography, diffusion, ion implantation, or a combination of any of the above. Generally, these methods for making optical layers and optical waveguides are complex, inefficient, and are generally not suitable for high volume manufacturing. However, as use of optical layers and optical waveguides increase, a need for a fabrication method and a structure that allows for an efficient and a cost effective manufacturing method of optical layers and optical waveguides will be required.

Conventionally, optical layers and optical waveguides are manufactured by a combination of photolithographic and etching processes. For example, a conventional optical layer is fabricated by applying a suitable optical material onto a substrate. A photoresist material is then applied onto the optical material and subsequently patterned by a photolithography process. The pattern defined by the photolithography process is subsequently transferred into the optical material by an etching process that removes exposed portions that are not covered by the photoresist material. The substrate with the etched pattern is subsequently cleaned, which removes the residual photoresist material and leaves a resultant optical layer in place on the substrate. As is described above, conventional fabrication of optical layers is a sequence of complicated and expensive processing steps.

Waveguides are fabricated in a similar manner by stacking the optical layers each having an appropriate index of refraction on top of each other, thus creating a sandwich structure having a core region and cladding regions surrounding the core region. Typically, these stacked optical layers are generated by the previously described combination of photolithographic and etching processes. However, several problems are generated due to the stacking of the optical layers such as alignment, sizing, and etching problems. As can be seen by the example provided above, the manufacturing of optical layers is a series of complex processes which are very expensive. Further, manufacturing of waveguides are even more complex, more expensive and more costly than the fabrication of optical layers.

It can be readily seen that conventional methods for manufacturing optical layers and waveguides have severe limitations. Also, it is evident that conventional processes that are used to fabricate optical layers and optical waveguides are not only complex and expensive but also not amenable to high volume manufacturing. Therefore, a method for making optical layers and optical waveguides is highly desirable.

SUMMARY OF THE INVENTION

Briefly stated, a method for making a fused optical layer is provided. A first pattern is projected with a radiant energy source onto a radiation sensitive surface having a first charge, wherein the first charge of the radiation sensitive surface is locally changed to a second charge by the radiant source. The radiation sensitive surface having the first charge and the second charge is passed through an optical media, wherein the optical media is electrostatically attracted to the second charge on the radiation sensitive surface. A substrate with an associated charge is passed in proximity to the radiation sensitive surface, thereby the optical media detaches from the radiation sensitive surface and reattaches to the substrate via electrostatic charges between the optical media and the associated charge of the substrate. The substrate is subsequently heated, thereby fusing the optical media together to produce an optical layer.

DETAILED DESCRIPTION OF THE DRAWINGS

Figure 1:
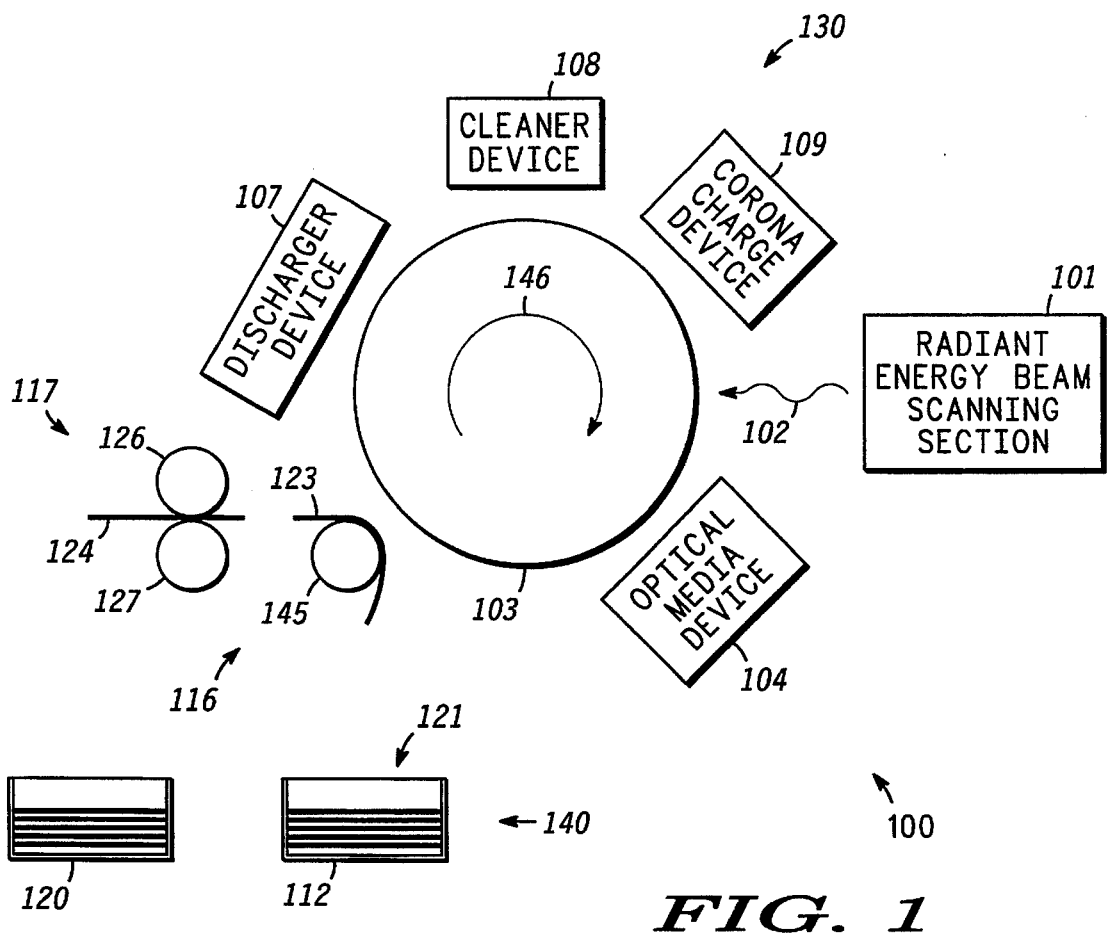
FIG. 1 is a simplified block-pictorial illustration of an optical fusing system.

FIG. 1 is a simplified block pictorial illustration of an optical fusing system 100. It should be understood that optical fusing system 100 is simplified and is intended only to further the understanding of the present invention. However, due to the simplicity of FIG. 1 it should be understood that many specific engineering details have been omitted for greater clarity of the present invention.

Generally, optical fusing system 100 is divided into three main sections, i.e., a radiant energy beam scanning section 101, an electrophotographic section 130, and a substrate feeding and removal section 140.

Radiant energy beam section 101 is further divided into several different well-known in the art subsections that include a radiant energy beam source, a modulator, a mirror system, and a lens system. Radiant energy beam source is capable of being any suitable source of radiant energy beam sources such as a laser, an e-beam, an ion beam, or the like. However, it should be understood that by selecting different radiant energy beam sources different requirements are necessitated for modulating, focusing, reflection, and projection of a resultant beam from the radiant energy beam source.

By way of example only, with radiant energy beam source being a helium-neon laser, the resultant beam from the helium-neon laser is directed to the modulator. Typically, the modulator is a type commonly known as an acousto-optical modulator that is employed to turn the beam on and off. The beam then passes through a series of optical elements such as a beam expander, a cylindrical lens, a polygonal mirror, a toroidal lens, and a spherical doublet lens, thus resulting in focused beam 102 that is directed toward the electrophotographic printing section 130.

The electrophotographic printing section is a combination of elements that include a rotating drum 103, an optical media device 104, a discharging device 107, a cleaning device 108, and a corona charging device 109. Typically, rotating drum 103 is a cylindrical drum having two ends and a cylindrical surface (not shown). The cylindrical surface is further divided into a first and a second layer that are essentially formed on the cylindrical surface. The first layer of the cylindrical surface of rotating drum 103 is a conductive substrate (not shown). The second layer is a photoconductor (not shown) that is applied on top of the conductive substrate. The photoconductor has several material requirements such as high sensitivity at a wavelength of focused beam 102, a sufficiently large accumulated charge, a small dark decay charge, a sufficiently low residual voltage, and an excellent reproducibility and print durability. These requirements of the photoconductor are met by well-known materials that are both inorganic and organic in nature. For example only, when focused beam 102 has a wavelength that corresponds to a Helium Neon laser preferred organic materials such as PVK-TNF are used, and when focused beam 102 has other wavelengths inorganic materials such as selenium, cadmium, and zinc oxide are preferred.

Optical media device 104 is a system that stores optical media and allows optical media to be dispensed onto rotating drum 103. In the present invention, many different optical media materials are used, stored, and dispensed such as polyvinylchlorides, polyesters, polycarbonates, epoxies, polyimides, and polyamides. However, in a preferred embodiment of the present invention, either a styrene methyl methacrylate copolymer or styrene ethyl acrylate is used as the optical medium. Selection of a specific optical media is application specific, i.e., a selection of the specific optical media is dependent upon a set of desirable characteristics such as index of refraction, melting point, hardness, and charge. Typically, the optical media selected is in a powdery state that is easily applied onto rotating drum 103.

Discharging device 107 discharges the photoconductor. Typically, discharging device 107 operates by applying an AC. voltage or exposing the whole surface of the photoconductor to a radiant source, thereby discharging or equalizing the charge across the photoconductor.

Cleaning device 108 removes residual optical media from rotating drum 103. Typically, cleaning device 108 operates by using a blade, brush, or a sponge roller that is applied to rotating drum 103, thereby removing residual optical media from rotating drum 103.

Corona charge device 109 is a device that allows the photoconductor to be charged with a particular polarity determined by the photoconductor characteristics. It should be understood that depending upon the polarity characteristics of the photoconductor that either a positive charge or a negative charge can be established in the photoconductor. Typically, the charge voltage that is established in the photoconductor ranges between 0.6 through 1.0 Kev.

The substrate feeding section 140 includes substrate storage 112, transfer station 116, fusing station 117, and output storage 120. These various components work together to receive the image that is on rotating drum 103 and transfers that image to substrates 121 found in substrate storage 112.

Substrate storage 112 is a reservoir of substrates that are fed into optical fusing system 100 that will receive an image that is present on rotating drum 103. Typically, substrates 121 are made from any suitable material, such as mylar, paper, plastics, polyimides, and the like. Generally, substrates 121 are drawn from substrate storage 112 to transfer station 116 as a single sheet of substrate, as illustrated by curved line 123.

Transfer station 116 includes a corona charging system 145, that generates a strong charge. Substrate 123 is passed in close proximity between rotating drum 103 and corona charging system 145, thus the strong charge is associated with substrate 123. By having the strong charge associated with the substrate 123 and in close proximity to rotating drum 103, the optical media attached to rotating drum 103 is pulled off the rotating drum 103 to substrate 123 and deposits the optical media thereon. Substrate 122 subsequently moves to fusing station 117, where it is designated 124.

Fusing station 117 heats substrate 124 sufficiently so as to fuse or melt the deposited optical media together. Typically, the fusing of the optical media is achieved by passing substrate 124 that has optical media deposited thereon through rollers 126 and 127 that are heated. Rollers 126 and 127 are heated to a temperature that is dependent upon the material characteristics of substrate 124, the deposited optical media, and materials comprising rollers 126 and 127. Typically, rollers 126 and 127 range in temperature from approximately 50 degrees Celsius to 400 degrees Celsius, thus allowing a wide range of optical media to be used and to be fused together. However, in a preferred embodiment of the present invention, a temperature range from 100 degrees Celsius to 200 degrees Celsius is used. At the end of the fusing process, substrate 124 is deposited into output station 120.

By way of example only, a typical process using optical fusing system 100 is presented herein below. With the photoconductor being charged to a positive polarity and focused beam 102 originating from a laser, the focused beam 102 scans and exposes the photoconductor on rotating drum 103. The photoconductor is exposed by focused beam 102 in accordance to a print dot pattern which is originated from an electronic device such as a computer (not shown). Further, it should be understood that focus beam 102 scans across the photoconductor on rotating drum 103 at which time rotating drum 103 rotates slightly and focused beam 102 scans across the photoconductor again. This process is continued until the print dot pattern of an entire image is completed. Exposing the photoconductor to focused beam 102, discharges or decreases the electrostatic voltage on the photoconductor approximately 10 volts, thereby an electrostatic latent image is formed on the photoconductor.

The electrostatic latent image subsequently is rotated by rotating drum 103 so as to expose the electrostatic latent image to optical media in optical media device 104, thus allowing the optical media to be in contact with the electrostatic latent image. The optical media which has an associated positive charge is selectively attracted to the electrostatic latent image that is on the photoconductor, thereby attaching the optical media to the electrostatic latent image.

The electrostatic latent image having optical media attached thereto moves by rotating drum 103, as illustrated by an arrow labeled 146, to transfer station 116. At transfer station 116, a large negative charge is generated that is associated with substrate 123, thereby pulling the optical media from the electrostatic latent image to substrate 123, thereby depositing the optical media onto substrate 123.

Substrate 123 is subsequently passed to fusing station 117 where heated fusing rollers 126 and 127 fuse the optical media together, thereby making an optical layer. Once the fusing process has been totally completed on substrate 123, substrate 123 is deposited in the output station 120.

Rotating drum 103 rotates to discharging device 107 where the electrostatic latent image is dissipated by applying an AC voltage to the photoconductor, thereby effectively removing the electrostatic latent image from the photoconductor. Alternatively, discharging of the electrostatic latent image on rotating drum 103 is accomplished by exposing the photoconductor to a radiant energy beam.

Rotating drum 103 continues to turn to cleaning device 108 where residual optical media is removed by several methods such as contacting the photoconductor with a blade, a brush or a sponge roller, thereby removing residual optical media and making the photoconductor clean.

Finally, rotating drum 103 rotates to corona charge device 109. Corona charge device 109 places a fresh and uniform charge on the photoconductor, thus allowing the process to begin once again.

In the present invention, an optical layer or layers are easily fabricated with low cost and high efficiency. Additionally, it should be understood that multiple passes of substrate 123 through optical fusing system 100 allows for multiple patterns to be generated or stacked on top of each other, thereby preparing an inexpensive highly efficient waveguide. Further, use of the present invention allows a direct link between a computer design system and manufacturing of single mode and multimode waveguides. Furthermore, it should be evident that use of the present invention enables many optical geometries to be directly made from a computer aided design system, such as splits, cross-overs or intersections, couplers, or the like.

Figure 2:
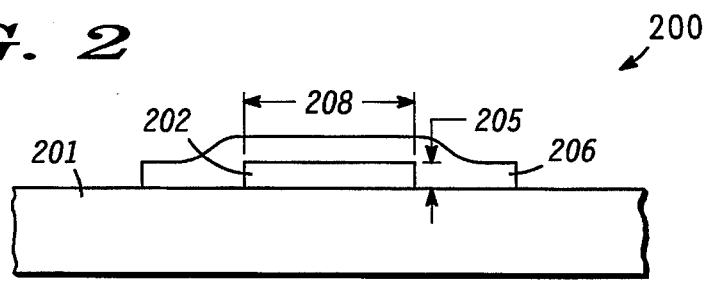
FIG. 2 is a simplified cross-sectional view of a waveguide.

FIG. 2 is a simplified cross-sectional view of a waveguide 200 fabricated by using the process described hereinabove. Substrate 201 is made of any number of materials such as mylar, plastics, paper, or the like. It should be noted that by selecting appropriate materials for substrate 201 that have an appropriate optical refractive index such as from 1.3 to 1.7 substrate 201 is capable of being an optical layer or cladding region. Fused optical layers 202 and 206 are made by using the present invention that deposits and fuses an optical media onto substrate 201 with heat. Generally, optical layer 202 is capable of being made by selecting any suitable material such as polyvinylchlorides, polyesters, polycarbonates, epoxies, polyimides, and polyamides having an appropriate refractive index such as from 1.3 to 1.7. It should be understood that selection of optical media materials is dependent upon specific applications as described hereinbefore.

Thickness 205 of optical layer 202 is adjusted by any suitable means such as depositing a greater amount of the optical media onto substrate 201 and subsequently fusing the optical media together or making multiple passes through optical fusing system 100 shown in FIG. 1. Alternatively, changes in thickness 205 are achieved by selection of optical media with particles that are large, as well as optimizing the electrostatic forces used in optical fusing system 100. Thickness 205 of optical layer 202 is deposited to approximately 9.0 microns for single mode operation for optical transmission; however, thickness 205 is deposited in excess of 9.0 microns for multimode optical transmission. Further, width 208 of optical layer 202 is determined by the computer system described in FIG. 1 that guides focused beam 102 onto rotating drum 103, thereby allowing virtually any width 208 to be fabricated. By controlling width 208 and height 205 of optical layer 202, optical layer 202 is capable of being used for either single mode application or multimode optical applications.

Optical layer 206 is made by passing substrate 201 with previously deposited optical layer 202 through optical fusing system 100, thereby depositing optical media onto the previously deposited optical layer 202, thereby fabricating waveguide 200. It should be noted that selection of materials for substrate 201 and optical layer 206 that have an index of refraction less than that of optical layer 202 provide optical cladding totally around optical layer 202.

Figure 3:
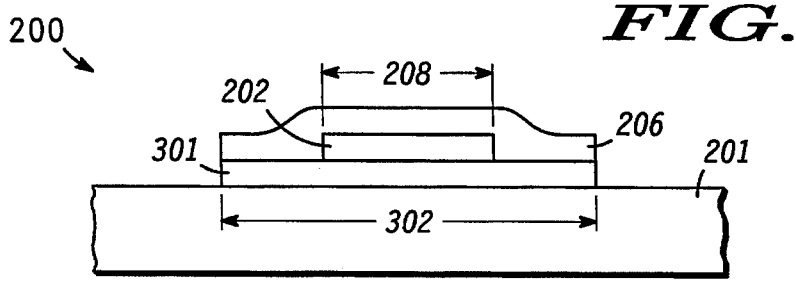
FIG. 3 is a simplified cross-sectional view of yet another waveguide.

FIG. 3 is yet another waveguide fabricated by fusing optical media onto substrate 201. The embodiment as shown in FIG. 3 is similar to the embodiment shown in FIG. 2 except for optical layer 301. Optical layer 301 is manufactured by fusing optical media as previously discussed in both FIGS. 1 and 2. An optical layer 202 and a layer 206 are then deposited over layer 301. However, it should be understood that optical layer 301 is fabricated such that it has a width 302 which is greater than width 208 of optical layer 202, thereby allowing total enclosure of optical layer 202. As previously stated hereinbefore, selection of specific materials used in manufacturing optical layer 301, optical layer 206, and optical layer 202 allows optical layer 202 to become a core region that is totally enclosed by cladding regions 206 and 301, thereby allowing optical signals to be passed through core region 202.

By now it should be appreciated that a novel method and apparatus has been described for making optical layers. The optical layers can be arranged such that either single mode or multimode optical transmission can be achieved. Additionally, the present invention allows for an inexpensive method for making waveguides, as well as allowing Computer Aided Design to be linked directly to the manufacturing method.

We claim:

1. A method for making a fused optical layer comprising the steps of:

providing a light source for projecting a directed light beam;

providing a photosensitive layer having a first charged surface, the first charged surface locally changes to a second charge in response to being exposed to the directed light beam;

projecting the directed light beam onto the first charged surface, thereby locally generating the second charge in the first charged surface of the photosensitive layer;

exposing the photosensitive layer to an optical media material that is optically clear having a charge different than the second charge, thereby selectively attracting the optical media material to portions of the photosensitive layer having the second charge;

passing a substrate having a charge different than the charge associated with the photosensitive layer in close proximity to the photosensitive layer having the optical media material attracted thereto, thereby attracting the optical media material from the photosensitive layer to the substrate; and heating the substrate to fuse the optical media material together forming a clear optical layer with a refractive index ranging from 1.3 to 1.7.

2. A method for making a fused optical layer as claimed in claim 1 wherein the step of providing of the photosensitive layer having a first charge is achieved by providing the first charged surface with a negative charge.

3. A method for making a fused optical layer as claimed in claim 1 wherein the step of exposing of the photosensitive layer to the optical media material is achieved with the optical media material having a negative charge.

4. A method for making a fused optical layer as claimed in claim 1 wherein the step of heating of the substrate to fuse the optical media material is accomplished by heating the substrate to a temperature in the range of 50 degrees Celsius to 400 degrees Celsius.

5. A method for making a fused optical layer as claimed in claim 1 wherein the step of providing a light source includes a laser that responds to an electrical image signal and transforms the electrical image signal into an output laser light.

6. A method for making a fused optical layer as claimed in claim 1 wherein the step of exposing of the photosensitive layer to an optical media material is achieved by selecting one optical media material from a group consisting of styrene, acrylates, polyvinylchlorides, polyesters, polycarbonates, epoxies, polyimides, and polyamides.

7. A method for making a fused optical layer as claimed in claim 6 wherein the step of exposing of the photosensitive layer to an optical media material is achieved by selecting an optical media material selected from a group consisting of a styrene methyl methacrylate copolymer and styrene ethyl acrylate.

8. A method for making a fused optical waveguide comprising the steps of:

projecting a first pattern with a radiant energy source onto a radiation sensitive surface having a first charge, wherein the first charge of the radiation sensitive surface is locally changed to a second charge by projection of the radiant energy source onto the radiation sensitive surface, thereby generating portions having a first charge and portions having a second charge on the radiation sensitive surface;

passing the radiation sensitive surface having portions having the first charge and portions having the second charges of the radiation sensitive surface through an optical media, wherein the optical media is electrostatically attracted to the second charge on the radiation sensitive surface, thereby allowing a portion of the optical media to be selectively attached to portions having the second charge of the radiation sensitive surface;

passing a substrate with an associated charge different than the second charge in proximity to the radiation sensitive surface having the optical media being attached thereto, the optical media being detached from the radiation sensitive surface and teatracheal to the substrate via electrostatic charges between the optical media and the associated charge of the substrate; and heating the substrate with the optical media attached thereto to fuse the polymer optical media into a first optical layer having a refractive index from 1.3 to 1.7.

9. A method for making a fused optical waveguide as claimed in claim 8 wherein the step of providing of the substrate is achieved by providing a substrate selected from a group consisting of mylar, polyvinylchlorides, and plastic.

10. A method for making a fused optical waveguide as claimed in claim 8 wherein the step of heating of the substrate is accomplished by heating the substrate in a range from 50 degrees Celsius to 400 degrees Celsius.

11. A method for making a fused optical waveguide as claimed in claim 8 further comprising the steps of:

projecting a second pattern with a radiant energy source onto a radiation sensitive surface having a first charge, wherein the first charge of the radiation sensitive surface is locally changed to second charge by projection of the radiant source onto the radiation sensitive surface, thereby generating portions having a first charge and portions having a second charge on the radiation sensitive surface;

passing the radiation sensitive surface having portions having the first charge and portions having the second charges of the radiation sensitive surface through an optical media, wherein the optical media is electrostatically attracted to the second charge on the radiation sensitive surface, thereby allowing part of the optical media to be attached to portions having the second charge;

passing the substrate with an associated charge in proximity to the radiation sensitive surface having the optical media attached thereto, the optical media being detached from the radiation sensitive surface and reattached to the substrate; and heating the substrate with the optical media attached thereto to fuse the optical medial into a second optical layer having a refractive index ranging from 1.3 to 1.7.

12. A method for making a waveguide as claimed in claim 11 further comprising the steps of:

projecting a third pattern with a radiant energy source onto a radiation sensitive surface having a first charge, wherein the first charge of the radiation sensitive surface is locally changed to a second charge by projection of the radiant source onto the radiation sensitive surface, thereby generating portions having a first charge and portions having a second charge on the radiation sensitive surface;

passing the radiation sensitive surface having portions having the first charge and portions having the second charges of the radiation sensitive surface through an optical media, wherein the optical media is electrostatically attracted to the second charge on the radiation sensitive surface, thereby allowing part of the optical media to be attached to portions having the second charge;

passing the substrate with an associated charge in proximity to the radiation sensitive surface having the optical media attached thereto, the optical media being detached from the radiation sensitive surface and reattached to the substrate; and heating the substrate with the optical media attached thereto to fuse the optical media into a third optical layer having a refractive index ranging from 1.3 to 1.7.

13. A method for forming an optical layer comprising the steps of:

electrostatically forming an image on a photosensitive surface;

applying a particulate charged optical material to the electrostatically formed image to form an image of particulate optical material;

transferring the particulate optical material image from the photosensitive surface to a substrate; and fusing the particulate charged optical material image on the substrate forming an optical layer having a refractive index ranging from 1.3 to 1.7.

14. A method for making a waveguide comprising the steps of:

electrostatically forming a first image having a first width on a photosensitive surface;

applying a particulate charged optical material to the electrostatically formed first image forming a second image of the particulate charged optical material having a second width substantially similar to the first width;

transferring the second image of particulate charged optical material to a substrate forming a third image of particulate charged optical material on the substrate; and fusing the third image of particulate charged optical material image on the substrate to form an optical layer having a refractive index ranging from 1.3 to 1.7 and having a third width substantially similar to the first width.

* * * * *

UNITED STATES PATENT AND TRADEMARK OFFICE
CERTIFICATE OF CORRECTION

PATENT NO. : 5,468,582

DATED : Nov. 21, 1995

INVENTOR(S) : Thomas H. Blair, et al

It is certified that error appears in the above-indentified patent and that said Letters Patent is hereby corrected as shown below:

Column 7, line 34, claim 8, "teatracheal" should read --reattached--

Signed and Sealed this

Fourteenth Day of May, 1996

Attest:

BRUCE LEHMAN

*Attesting Officer*     *Commissioner of Patents and Trademarks*